United States Patent

[11] 3,612,833

[72] Inventor Wilbur M. Davis
Rochester, Minn.

[21] Appl. No. 789,730
[22] Filed Jan. 8, 1969
[45] Patented Oct. 12, 1971
[73] Assignee International Business Machines Corporation
Armonk, N.Y.

[54] EMBOSSED CARD READING DEVICE
5 Claims, 10 Drawing Figs.

[52] U.S. Cl. ........ 235/61.11C, 101/269
[51] Int. Cl. ........ B41f 3/04, G06k 7/04
[50] Field of Search ........ 235/61.11, 61.111-61.115, 61.7 B; 340/149 A; 179/6.3 CC, 90 CI; 101/269

[56] References Cited
FOREIGN PATENTS
1,115,813 10/1961 Germany ........ 235/61.12

*Primary Examiner*—Maynard R. Wilbur
*Assistant Examiner*—Thomas J. Sloyan
*Attorneys*—Hanifin and Jancin and Robert W. Lahtinen

ABSTRACT: The disclosure pertains to a reader for an embossed print element which senses the recessed surface portion of the embossed characters by scanning the characters with a series of sensing indicia which each create a yes or no condition. The sensed signals are superimposed upon a series of timing signals which permit a counter and decoder to identify the character or code element which has been scanned.

*INVENTOR.*
WILBUR M. DAVIS

*BY* Robert W. Lahtinen
*ATTORNEY*

EMBOSSED CARD READING DEVICE

BACKGROUND OF THE INVENTION

This invention relates to card or plate readers and more particularly to a device for reading embossed characters or coded embossments on semirigid or rigid cards or plates.

The present use of credit and identification cards and plates requires that the card be read by a device or terminal for machine processing. This may be done with an intermediate printing operation wherein the document printed subsequently has the information entered thereon entered into a data-processing system by optical scanning. However, in many instances it is desirable or necessary to sense characters or coded material directly as for example an application where it is sought to check credit before a transaction occurs.

It is further desirable to utilize devices such as credit cards that are already in use, since a commitment has been made to the devices in current use and a substantial financial burden would be entailed in any change that would require overall replacement.

The present equipment is directed to identifying the raised portion of embossed identifying cards or plates. Although it is desired to use characters that are visually recognizable as well as machine readable, a machine-sensing device can identify just as adequately the recessed reversed image as the raised positive image and the recessed portion of such devices has inherent advantages from the viewpoint of machine identification. Since the projections of the debossments are rarely damaged even in instances of severe damage to the embossed portion, the use of the debossment for sensing is more likely to be effective throughout the period of card use.

Wear and damage often occur to the embossment as the result of the use of this portion of the plate member as a printing element. When imprinting journal records and receipts using the card, one of two methods of printing are utilized, either maintaining a constant force between the print element and the roller platen or maintaining a fixed interference between the print element and roller plate. With a constant force the pressure increases when a reduced character area resists the platen force tending to progressively damage characters particularly those with single line portions parallel to the path of travel of the roller platen. When maintaining a positive interference all characters tend to be crushed to a uniform height. This causes progressive damage since the cards are usually utilized at various locations with the best print quality effected by the device with the greatest interference and the consequent tendency to increase the interference to improve the impression generated by a given imprinter. In either method a form of progressive damage to the embossed portion must be tolerated. This damage however has no significant effect on the debossed undersurface.

SUMMARY

The present invention provides a low cost reader for embossed cards which identifies characters one at a time and transmits the information to a processing complex. The reader can be used either alone or may be incorporated in other machinery. The reader of this invention, rather than trying to dissect each character into many elements and then interpret what these combinations of elements mean utilizes a masking technique which produces a yes or no condition as to possible choices as a character is scanned. In the principal embodiment the reader utilizes a disc which has been divided into 10 radially separated flexible segments about two-thirds of its circumference. Each segment is engraved with the vertical components of a character with the scanning disc formed thereby slightly tilted and rotated against the bottom surface of the embossed card so that the individual segments are flexed as they pass under the character to be read. A character of the card to be read is registered over the scanning disc whereupon the disc rotates through the scanning portion of one revolution. When a match is achieved the vertical configuration engraved on that segment will align with the debossed cavity of the character being read and fit therein. The upward movement of the flexed segment when a match occurs is sensed by a microswitch to detect the displacement and provide a signal which denotes that a character has been recognized. Since the vertical configurations of the various characters are not always exclusive of all other characters, the order of the scanning segments is arranged so that those characters which will be sensed by more than one configuration have the correct configuration tested before others. Thus within one scanning cycle the first signal of a possible plurality identifies the character.

During the rotation of the scanning disc wherein scanning is not taking place the credit card is mechanically advanced to the next character position so that with the beginning of the scanning portion of the next subsequent revolution scanning is begun with respect to the newly positioned character.

As illustrated in the alternative embodiments beginning in the drawings with FIG. 8 the recognition of characters can also be accomplished by linear scanning utilizing one or a plurality of scanning strips which contact the card surface having debossed characters and separating the scanning elements so that a match between scanning element and credit card character can be identified.

It is the object of this invention to provide an improved economical device for reading embossed cards and further to provide such a device which utilizes the debossed surface for machine reading to overcome the principal limitations on embossment quality in used or damaged cards. These and other objects, features and advantages of the invention will be apparent from the following more particular description of preferred embodiments of the invention.

DETAILED DESCRIPTION

Figure 1:
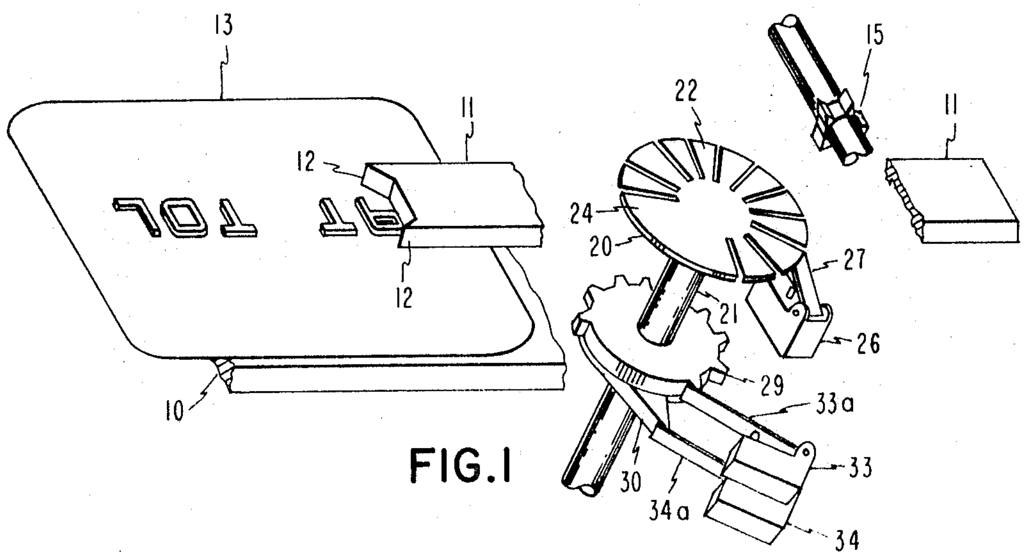
FIG. 1 is an exploded isometric view partly broken away of portions of the reader of the present invention.
Figure 2:
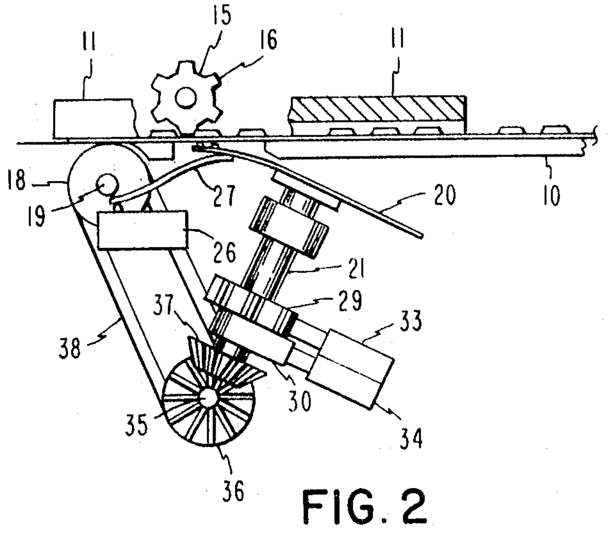
FIG. 2 is partial side elevation partly broken away and partially in section of the reader of FIG. 1.
Figure 3:
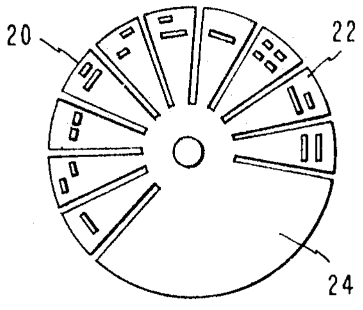
FIG. 3 is a plan view of the sensing disc of the reader of FIG. 1.

Referring to FIGS. 1 and 2 of the drawings the reader includes a card bed 10 and an elongated, vertically spaced stationary card guide 11 which cooperate to support and transversely position an embossed card 13 which is to be read. The stationary card guide 11 is an inverted channel member extending in the direction of card travel as indicated by the arrow A and having the flange portions 12 projecting downward to confine the embossed characters therebetween and effect transverse alignment and positioning of the card. The stationary guide has a slotted web portion through which is received a rotary gate member 15 which presents a series of teeth 16 against which the individual embossed characters are brought into alignment. The rotary gate 15 indexes to present the alignment teeth 16 sequentially in an aligning position with adjoining teeth forming an escapement whereby the succeeding tooth is in position to intercept the next adjoining embossed character before its predecessor is released from restraint. Confining the embossed characters between the flanges 12 portions of stationary guide 11 compensates for any failure in the alignment of a series of embossed characters with respect to the edge of the card. The flanges 12 are made thin enough so as not to be intercepted by other lines of raised character on the card, should they be present. A continuously running drive roll 18 is supported on a shaft 19 and projects through an aperture in card bed 10 to engage a card being read and urge it in the direction of travel as indicated by arrow A. A scanning disc 20, also shown in FIG. 3, is supported for rotation on a shaft 21. The scanning disc 20 presents a series of radially extending resilient segments 22 which form the sensing portion and extending about two-thirds of the periphery, each carrying thereon embossed indicia 23 representative of a given character. The segment portion 24 forming the remaining one-third of the periphery of the scanning disc 20 is blank and provides a period of disc rotation during which the embossed plate or card 13 is indexed. As shown in FIG. 2, the scanning disc 20 is positioned in an inclined relation with respect to a card being sensed with the segments 22 deflected as they pass in physical contact with the card 13. A switch 26 is mounted on the device with an actuating arm 27 that has the distal end disposed to contact with the underside of the scanning disc sensing segments 22 immediately underlying the debossed portion of the embossed character which is being sensed. When a match occurs between the embossed indicia 23 on the scanning disc 20 and the debossed underside of the card the disc segment 22 in contact with the switch actuating arm 27 will rise causing the contacts within the switch 26 to close signaling that a match has occurred between the sensing segment 22 and the card character debossment aligned therewith. A pair of cams 29, 30 are also mounted on the shaft 21 for rotation in unison therewith. Each of the cams 29, 30 has associated therewith a switch 33 and 34 respectively with actuating elements 33*a* and 34*a* arranged to close the associated switch contacts each time a cam projection depresses the actuating arm engaged thereby. The motor drive shaft 35 carries a bevel gear 36 which engages the bevel gear 37 to drive shaft 21 and a sprocket which drives the shaft 19 and drive roll 18 through the belt 38. The rotary gate 15 is driven from the shaft 35 by means of a power train (not shown) including an incrementing means which effects incremental movement of the card 13 between embossed character positions during the passage of the blank portion 24 of the scanning disc 20 past the sensing location and effects the dwell period during the two-thirds of the rotation of the scanning disc during which the segments 22 carrying embossed indicia 23 are passed over the card debossed character at the sensing location.

In reading debossed characters the scanning disc 20 of this device does not attempt to dissect each character into many elements and then interpret what the combinations of elements signify, but utilizes a masking technique to produce a yes or no condition as the character is scanned with possible choices. In the embodiment shown, the segments 22 forming two-thirds of the sensing element provide 10 discrete segments. Each segment is engraved with the vertical components of a character. In the example shown the disc 20 scans and identifies the 10 numeric characters with the disc tilted slightly and rotated against the bottom surface of the card causing the individual segments to flex during passage beneath the character being read so that with the character in the scan position the disc makes two-thirds of a complete revolution. When a match is achieved a vertical configuration engraved on that segment will fit into the cavity of the embossed character which was created on the back of the card when it was embossed.

Figure 4:
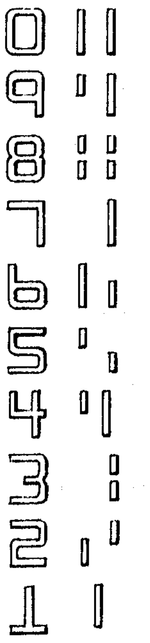
FIG. 4 shows a typical numerical font for embossed cards and the engraved indicia corresponding to each numeric character.
Figure 5:
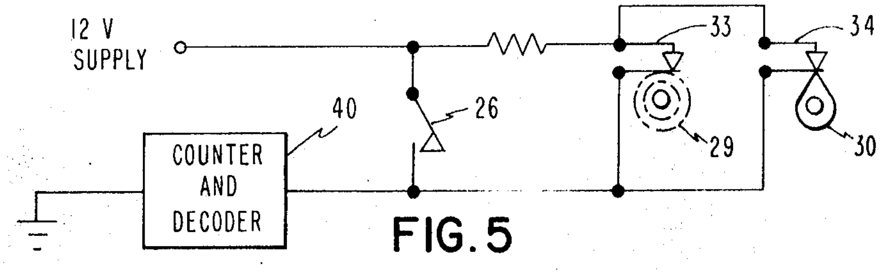
FIG. 5 is a simplified circuit diagram of the timing and sensing portions of the reader of FIG. 1.

FIG. 4 shows an embossed numeric character font and corresponding indicia indicative of the vertical portions of the character debossments. The vertical configurations of the various characters are not always exclusive of all other characters. For example the configuration of the number three would also fall into the cavity of an embossed zero and the embossed zero would accommodate the vertical configuration portions of the 9, 8, 7, 6, 5 and 2. To accommodate the existence of multiple signals, the order of the scanning segments is arranged so that those characters which will be sensed by more than one engraved configuration have the correct configuration tested before others. Thus within one scanning cycle the first signal of possibly many identifies the character. As seen in FIG. 5 the device is supplied with a DC input, here shown as 12 volts, with switches 26, 33 and 34 arranged in parallel with one another and in series between the supply and a counter decoder 40. Switches 33 and 34 are in series with a dropping resistor so that closing either of the switches provides a 6-volt signal whereas closing switch 26 provides a 12-volt signal.

Figure 6:
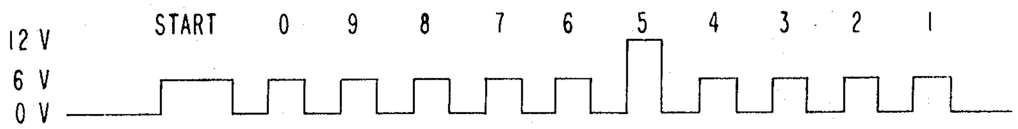
FIGS. 6 and 7 are timing charts indicating the counting and sensing pulses from the reader of FIG. 1.
Figure 7:
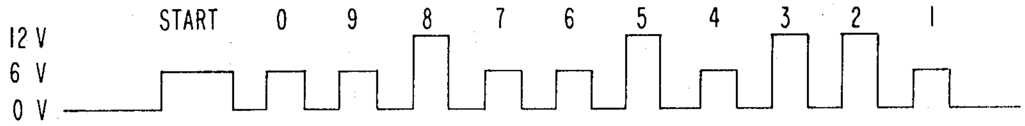

In operation, a card 13 is inserted into the device with the line of numeric characters aligned between the stationary guide flanges 12 until the leading edge comes under the control of the continuously running drive roll 18. The card is carried forward in the direction of the arrow A until the initial character is intercepted by the rotating gate 15 and held by one of the projections 16 in a position to be sensed by the scanning disc 20. A slip clutch (not shown) in the drive train which rotates drive roll 18 prevents injury to either card or drive train when the card is restrained by one of the alignment teeth 16. During the dwell period of the rotary gate 15 the card embossed character is urged against the confronting restraining tooth 16 to hold the embossed character in a desired position of alignment and simultaneously the 10 sensing segments 22 of the scanning disc are passed over the debossed underside of the character to be sensed. Immediately prior to the scanning portion of the cycle rotation the rise portion of cam 30 passes the switch actuating arm 34*a* to provide a long 6-volt start pulse. The cam 29 has a series of 10 projections which depress the actuating arm 33*a* coincident with the presence of each respective sensing segment in its aligned sensing position to provide a series of 10 6-volt pulses. When a match occurs between an engraved element on a sensing segment and the debossed character, the segment 22 at the sensing position rises indicating a match and permits actuating arm 27 to rise closing the switch 26. When the switch 26 closes a 12-volt pulse is superimposed on the corresponding 6-volt pulse of the train of pulses. If a numeric 5 is in the sensing location the signal from the reader would be a sequence of pulses as shown in FIG. 6 wherein there is an initial 6-volt start pulse followed by a train of 6-volt pulses and a single 12 volt indicating the presence of a 5. However when as shown in FIG. 7 a numeric 8 is disposed at the sensing station a series of 12-volt pulses will occur as the sensing elements representative of the numeric 5, 3 and 2 also register a match with the debossment of the character 8. In this circumstance only the initial 12-volt pulse generated by the match with the character 8 is recognized by the decoder as indicative of a character read.

Figure 8:
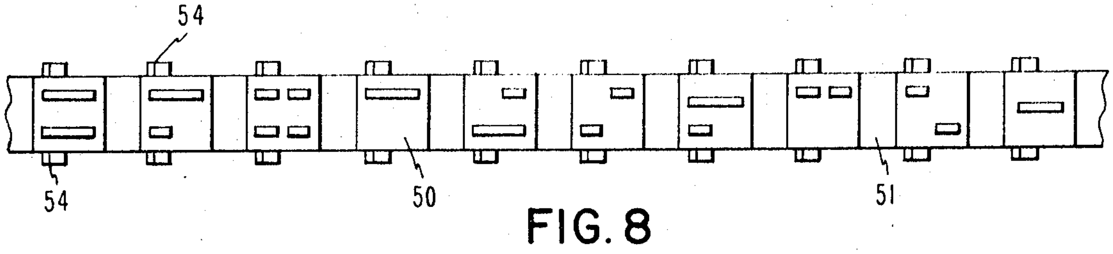
FIG. 8 is an alternative embodiment showing a linear-scanning strip.
Figure 9:
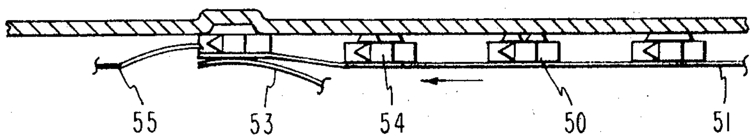
FIG. 9 is a side elevation of the scanning strip of FIG. 8 showing the relationship with a sectioned cooperating embossed card.

An alternative embodiment is shown in FIGS. 8 and 9 wherein a series of scanning elements 50 are mounted in linear sequence on a flexible strip 51 to permit independent vertical movement when a match is established between the engraved indicia 52 carried on the upper surface thereof and the overlying aligned debossment of a character to be sensed.

By modest variation of the structure the device can read embossed characters on a plate serially, in parallel or by a combination of these methods. In the form illustrated in FIG. 9 the scanning elements 50 are passed serially beneath the debossed character surface and urged thereagainst by a leaf spring element 53. When a match occurs the trunnions 54 projecting from each transverse side of each of the elements 50 are positioned above the stationary guide 55 and when there is a failure to match the trunnions 54 pass below the lower stationary guide 55. Identification of the first sensing element positioned with trunnions 54 above the stationary guide 55 establishes the identity of the character sensed.

Figure 10:
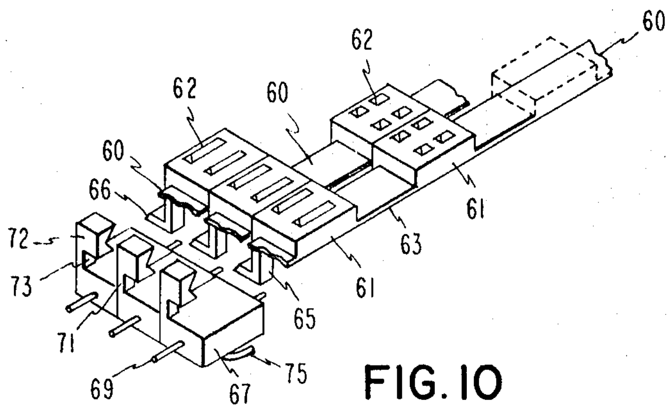
FIG. 10 is a second alternative embodiment showing a linear scanning strip.

In another variation shown in FIG. 10, a bank of parallel scanning strips 60 each includes a series of sensing elements 61 with engraved sensing portions 62 and mounted on a flexible strip 63 to permit independent vertical displacement with the strips arranged for simultaneous passage along a line of debossed character surfaces. Each sensing element has a depending arm 65 with a cantilevered contact-engaging projection 66 extending therefrom. Underlying each of the sensing strips is a contact assembly 67 which is journaled about a rod 69 for movement parallel to the path of travel of the associated scanning strip 60. Each contact assembly has an upwardly extending arm 71 and a projection 72 with a groove facing the sensing element projection 69 and forming a channel 73 between the body of the contact assembly and projection 72.

In operation the sensing strips 60 are moved linearly past a sequence of debossed characters. When a match does not occur the sensing element projection 66 passes through the associated contact channel 73 without disturbing the contact. When a match does occur the sensing element rises causing the sensing element projection 66 to engage the groove of contact projection 72 and thereafter move the contact assembly in unison with the associated sensing strip 60. The contact assembly terminal position is in overlying relation to a circuit board (not shown) having a matrix contact with a linear sequence associated with each contact assembly. The circuit board contact engaged by the contact assembly depending contact 75 is determined by the sensing element which carries the contact assembly to the terminal position.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device for reading indicia on a plate member, said indicia comprising a number of embossments on the upper surface representative of information and having an equal number of recesses on the reverse side, each recess corresponding in position with its respective embossment, comprising:

a scanning element having a series of flexibly interconnected first surface portions, each carrying a characteristic form of embossed indicia thereon;

drive means for passing said scanning element first surface portions sequentially past a debossed character on said reverse side of said plate member;

sensing means for indicating when a scanning element first surface portion presents embossments that match and are received in a confronting character debossment; and wherein said scanning element first surface portions are arranged in a predetermined sequence wherein the first of said first surface portion embossed indicia to register with and be received in a confronting debossed character is indicative of the character sensed.

2. The combination of claim 1 wherein said scanning element first surface portions move past said character horizontal centerline in a direction substantially parallel to the vertical axis of said debossed character and said scanning element embossed indicia are coincident with debossed portions of the character corresponding thereto which extend parallel to the vertical axis of such character.

3. The combination of claim 1 wherein said scanning element comprises:

a disc having a series of radially separated resilient segments with said first surface portions respectively disposed on surfaces of said segments; and said drive means comprises means for rotating said disc to bring said first surface portions in sequential biased contact with one of said plate member debossed characters.

4. The combination of claim 1 wherein said scanning element comprises:

a longitudinal strip of material having said first surface portions serially interconnected; and said drive means passes said first surface portions linearly past said plate member debossed character.

5. The combination of claim 4 wherein said scanning element embossed indicia extend generally parallel to the direction of travel of said scanning element as said scanning element is moved in engaging contact with said plate member past the debossed character being sensed.